United States Patent [19]

Horn

[11] 4,110,621

[45] Aug. 29, 1978

[54] TOMOGRAPHY X-RAY DETECTOR

[75] Inventor: Berthold K. P. Horn, Concord, Mass.

[73] Assignee: Butler-Newton, Inc., Newton, Mass.

[21] Appl. No.: 780,284

[22] Filed: Mar. 23, 1977

[51] Int. Cl.² ........................... G01T 1/20; G01T 1/22
[52] U.S. Cl. ................. 250/361 R; 250/368; 250/370
[58] Field of Search ............. 250/361, 362, 363, 368, 250/370-371

[56] References Cited

U.S. PATENT DOCUMENTS

| 3,030,509 | 4/1962 | Carlson | 250/363 |
| 3,053,982 | 9/1962 | Carlson | 250/368 |
| 3,247,377 | 4/1966 | Hall | 250/265 |
| 3,742,215 | 6/1973 | Meuleman | 250/370 |
| 3,798,448 | 3/1974 | Menefee et al. | 250/361 |
| 3,916,200 | 10/1975 | Sparks et al. | 250/370 |
| 3,932,756 | 1/1976 | Cowell et al. | 250/361 |

Primary Examiner—Alfred E. Smith
Assistant Examiner—Janice A. Howell
Attorney, Agent, or Firm—Cesari and McKenna

[57] ABSTRACT

A small but very efficient X-ray detector operating in a current integrating mode for use in high speed tomography apparatus comprises a scintillator that is entirely coated with a highly reflective matte material except for a relatively small-area window. A P.I.N photo-diode is juxtaposed with the scintillator opposite the window and the two are secured together at an optical interface comprising a transparent adherent material preferably having an index of refraction between the indices of the scintillator and the photo-diode. The ratio of the active surface area of the photo-diode to the area of the scintillator coated with reflective material is appreciably less than unity.

11 Claims, 3 Drawing Figures

TOMOGRAPHY X-RAY DETECTOR

BACKGROUND OF THE INVENTION

This invention relates to an X-ray detector. It relates more particularly to an X-ray detector that can be incorporated in relatively large numbers into high speed tomography apparatus to produce output signals for developing an image representing a two dimensional slice through a patient's body.

In a scanner such as this, a fan-shaped X-ray beam is moved from one source position to another so that the beam repeatedly passes edgewise through a selected slice of a patient's body. The X-rays following different tracks through that slice are absorbed to a greater or lesser degree depending upon the absorbtivities of the particular tissues, bones and fluids which they encounter. Resultantly, the intensities of the X-rays emerging from the body slice contain information relating to the characteristics of the tissues, bones, etc. along the particular tracks followed by the X-rays. An array of detectors positioned opposite the beam source beyond the patient's body measures the intensity of the emergent radiation and the output signals from these detectors correspond to the measured radiation intensities. These signals are correlated and processed by a computer to produce a two dimensional image of that body slice using techniques well known in the art.

If the resultant image is to accurately depict the body slice and to avoid exposing the patient to more than the minimum radiation dosage necessary to collect enough information for the reconstruction, it is essential that the detector array detect a maximum number of — ideally all of — the emergent X-rays. In practice, it has been found that due to the extremely wide variation in the densities of the tissues, bones, voids, fluids, etc. in the body, the intensity of the detected radiation can vary over an extremely wide range, e.g. 100,000 to 1 or more. Consequently, the detectors employed in scanners such as this must have a corresponding wide dynamic range.

Also in high speed tomography apparatus with which we are particularly concerned here, the X-ray beam scans at a high rate of speed, e.g. 100 to 1000 X-ray pulses or source positions per second. To obtain a measurement useful for reconstruction, many X-ray photons must strike the detector (e.g. 100,000) during each pulse. Clearly, very many X-ray photons are detected per second in each detector. As a result, it is not feasible to count individual X-ray photons electronically. Instead a current proportional to the X-ray flux is integrated. This current is obtained from the detector which is receiving a visible light flux from the scintillator which is directly proportional to the incident X-ray flux. This current integrating mode of operation places special requirements on the light-sensor's linearity and constancy of response. Further, the light sensor used should not have appreciable offset currents, hysteresis or other time-varying behavior.

A third constraint on the detector is size. Each detector must be quite small, not only because of the large number of detectors required in a typical detector array, e.g. 600 or more, but also because the resolution of the resultant image varies inversely with the size of the detector and directly with the detector packing density.

Tomography scanners conventionally employ X-ray detectors in the form of scintillators which use photomultiplier tubes. These are fairly large devices, e.g. 2.5 cm or more on a side. Therefore in large numbers, they occupy a considerable amount of space. Also the resolution of the image which an array of such detectors can produce is not very high.

In nuclear and cosmic ray research, another type of detector consisting of a luminescing, fluorescing or scintillating crystal optically coupled to a photo-voltiac conversion cell has been employed to detect gamma radiation. However in these applications, invariably the detectors are used in a pulse mode to count individual rays and also to determine their energy. The requirements for a detector used in this way are quite different from those that are important when a detector is used in the integrating mode as required for X-ray tomography, for example.

It has heretofore been proposed to use that general type of crystal/photo-cell detector in diagnostic X-ray applications. Proposals such as this are described, for example, in U.S. Pat. Nos. 2,899,560; 3,415,989; 3,814,938; and 3,932,756. However, the detectors disclosed there are relatively large and expensive and while they might be efficient enough in some diagnostic X-ray applications, they are apparently unsatisfactory for use in connection with tomography since none of them are being used in that application which in recent years has seen burgeoning research and development activity.

SUMMARY OF THE INVENTION

Accordingly the present invention aims to provide an X-ray detector that is especially suited for high speed tomography applications.

Another object of the invention is to provide an X-ray detector for tomography apparatus which is quite small so that a large number of them can be packed very closely in an array that yields an accurate, high resolution tomographic image.

Still another object of the invention is to provide a detector of this type which is small, yet highly efficient with a high signal-to-noise ratio.

A further object of the invention is to provide an X-ray detector for tomography applications which is relatively easy and inexpensive to manufacture in quantity.

Another object is to provide a detector of this type which is rugged and reliable and therefore which should have a long useful life.

Other objects will, in part, be obvious and will, in part, appear hereinafter.

The invention accordingly comprises the features of construction, combination of elements and arrangement of parts as exemplified in the following detailed description, and the scope of the invention will be indicated in the claims.

In general, the present detector comprises a scintillator that is coated entirely with a highly light reflective material except for a single, small-area window on one surface. A photo-diode preferably a P.I.N diode, is juxtaposed with the scintillator opposite the window and the two elements are secured together by a relatively pliable transparent adherent material. The ratio of the active surface area of the diode to the area of the scintillator covered with reflective material should be appreciably less than unity. Preferably also the securing material provides an optical interface in the window between the scintillator and diode whose index of refraction is intermediate the indices of the scintillator and the diode. In tomography applications, the current obtained from the detector is integrated to provide an indication of the photons incident on the detector.

The resultant detector can be made extremely small, i.e. on the order of 1 × 0.5 × 0.5 cm. Therefore, a large number of such detectors can be packed very closely together in an array that will yield a high resolution tomographic image. Moreover, the array of such detectors occupies a relatively small amount of space as compared with prior detector arrays used in this type of equipment.

Despite its small size, however, the present detector is highly efficient with a high signal-to-noise ratio. Therefore it can acquire the necessary radiation intensity data over the entire range of intensities normally encountered in the short time allowed by tomography apparatus having a fast scan time. Finally, since the detector is essentially a semi-conductor device, it is quite rugged and can be maufactured in quantity at relatively low cost.

BRIEF DESCRIPTION OF THE DRAWING

For a fuller understanding of the nature and objects of the invention, reference should be had to the following detailed description taken in connection with the accompanying drawing, in which.

DESCRIPTION OF THE PREFERRED EMBODIMENTS

Figure 1:
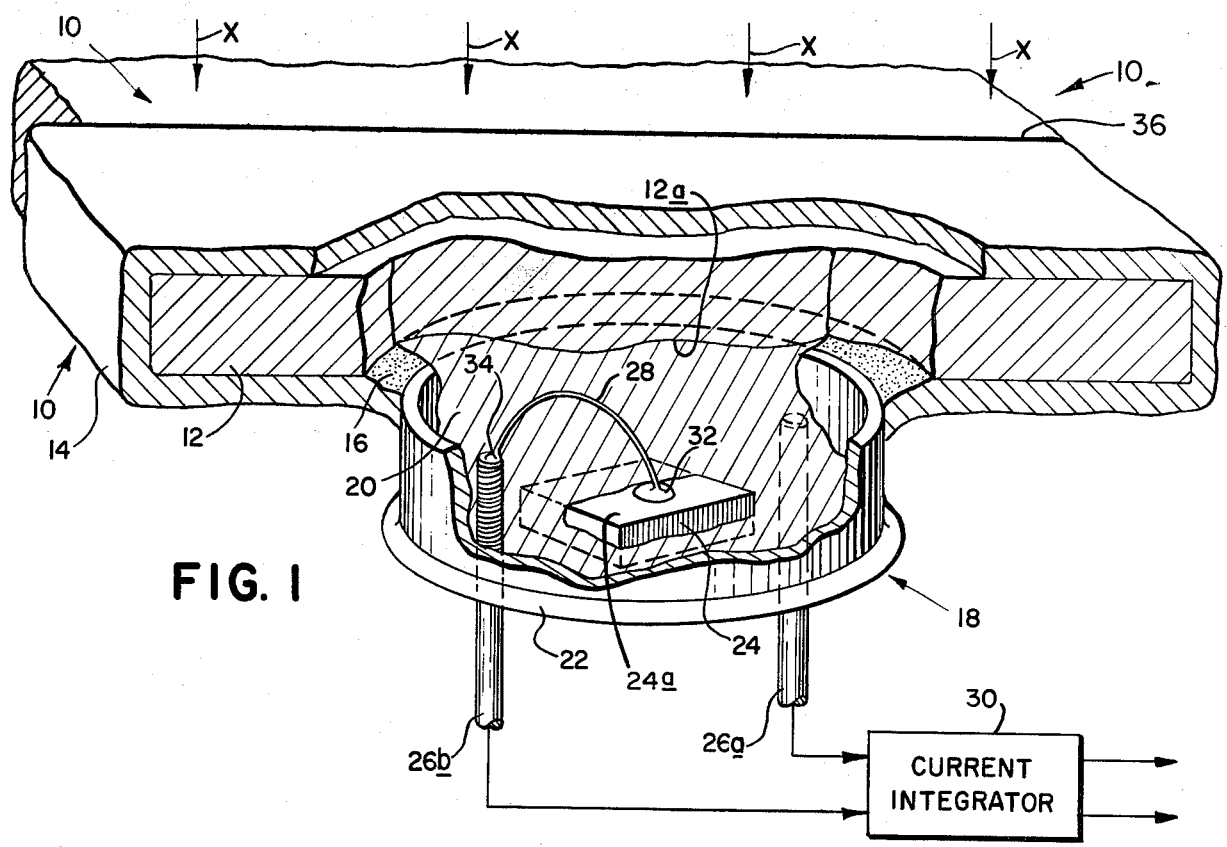
FIG. 1 is a perspective view, partly in section, of an X-ray detector made in accordance with this invention.

Referring first to FIG. 1 of the drawing, an X-ray detector made in accordance with this invention is illustrated generally at 10. It comprises a small, generally rectangular scintillator 12 which may be crystalline or plastic. This particular scintillator is a crystal of sodium iodide, bismuth germanate, cesium flouride or most preferably, thallium activated cesium iodide available from Harshaw Chemical Co. that scintillates when exposed to X-rays, with the light emissions being proportional to the intensity of the incident radiation.

All surfaces of scintillator 12 are coated with a coating 14 of a material that is highly reflective to the light emitted by the scintillator except for a relatively small window 16 on one surface. The coating is matte so as to scatter incident photons in many directions. This assures uniform distribution of light over the surfaces of the scintillator and avoids the phenomena of ligh-trapping inside the scintillator. Furthermore, specular or metallic surfaces tend to have considerably lower reflectance than matte surfaces made of finely divided transparent material of high refractive index. Materials that may be used here include MgO, $CaCO_3$, $BaSO_4$ and $TiO_2$ powders. A suitable coating for this purpose may be obtained from Eastman Kodak Co. under its designation "White Reflectance Standard." For purposes of illustration, the thickness of the coating 14 has been exaggerated. In actual practice, the coating thickness is on the order of 0.5 mm.

Positioned opposite window 16 is a diode assembly shown generally at 18. The diode assembly is anchored to scintillator 12 by means of a transparent adherent material 20. The diode assembly 18 comprises a relatively short, generally cylindrical, electrically conductive can or housing 22. Mounted in the can with its base surface anchored by conductive epoxy cement to the bottom of the can is a standard silicon photo-diode 24 operated photo-voltaically. Recently developed P.I.N. photo-diodes are particularly suited to this application because of their inherent linearity, large dynamic range, low drift in offset and gain, good quantum efficiency, low voltage requirements and repeatable behavior. Ideally, diode 24 is selected to have a spectral response corresponding to the optical emission of scintillator 12. A suitable diode is designated EGG, PV215B.

A pair of electrical terminals 26a and 26b project from the bottom of the can. The former terminal is electrically connected to the can and thus to the bottom of the photo-diode 24. The other terminal 26b is connected to the active surface of the photo-diode outside of window 16 by means of a "pigtail" lead 28 having one end connected electrically to the diode by solder ball 32 and having its opposite end connected to terminal 26b by a solder drop 34. In tomography applications, the terminals are usually connected to a current integrator 30.

The adherent material 20 fills the space in window 16 around the photo-diode 24 and between the diode active surface 24a and the opposing surface 12a of scintillator 12. Material 20 is selected to be relatively pliable so that it does not crack when the detector is vibrated and ideally to provide an optical interface between the diode and the scintillator which has an index of refraction intermediate of the indices of the diode and scintillator. However, the presently available materials which are satisfactory in other respects do not have an intermediate index. In lieu of this ideal material, a material having a high index of refraction compared to that of the scintillator should be used to minimize the effective reflectance of the window and so couple a maximum number of photons into the sensitive area of the diode. Also material 20 should have a coefficient of thermal expansion comparable to those of the diode and the scintillator so that variations in the ambient temperature do not create excessive stresses at the interface between the scintillator 12 and the diode assembly. Materials which satisfy all of these requirements simultaneously are difficult to find and as a result a compromise has to be reached in practice where, for example, the light-collection efficiency of the detector is reduced slightly by using a bonding material of lower than optimal refractive index. Materials suitable for this purpose include epoxy cement sold by Eastman Kodak Co. under its designation Kodak HE-79 cement and by Epoxy Technology Co., Waltham, Massachusetts under its designation EPOTECH 305.

Figure 3:
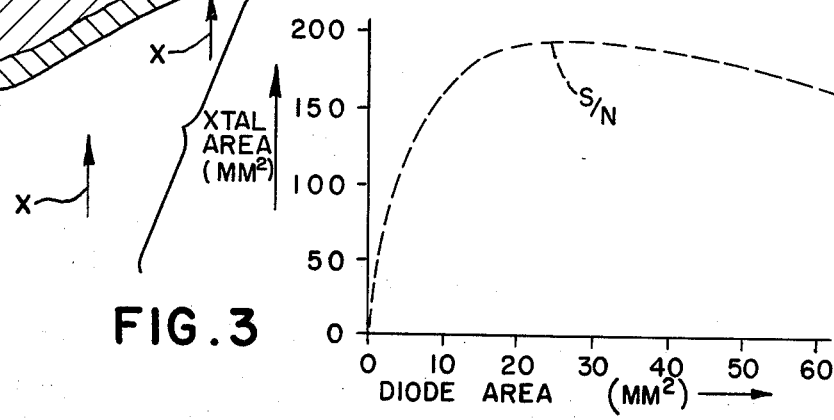
FIG. 3 is a graph illustrating certain characteristics of the detectors.

In accordance with this invention, the signal-to-noise ratio of detector 10 is optimized by making the area of the diode active surface 24a (typically 25mm$^2$) considerably different than the area of the scintillator covered with reflective material. More particularly, the ratio of the diode area to the scintillator area is selected to be appreciably less than unity. The FIG. 3 graph illustrates the signal-to-noise ratios (S/N) obtained over a range of diode/crystal area ratios. I have found that the ratio of diode area to scintillator area for optimum signal-to-noise ratio is a function of the reflectivity of the coating material, the fixed noise in the electronic integrator 30 and the capacitance per unit area of the material used in the photo-diode. For a small diode area, the signal is small, resulting in a poor signal-to noise-ratio. For a large diode area, the capacitance of the diode causes the noise in the electronic integrator 30 to be large, once again implying a low signal-to-noise ratio. For some intermediate value of diode area, usually much smaller than the scintillator area, the signal-to-noise ratio is optimized as seen from FIG. 3.

In any event, during operation of the detector 10, X-rays incident upon the detector from a direction indicated by the arrows X pass freely through the x-ray transparent coating 14 and interact with scintillator 12. The scintillator emits light having a wavelength of 400 to 600 nanometers. The light rays are multiply reflected by coating 14 and most eventually leave the scintillator through its window 16. Whereupon the emergent photons are incident upon the active surface 24a of photodiode 24 causing the diode to generate an electrical current proportional to the intensity of the incident radiation. In tomography applications, that current is integrated by integrator 30 whose output provides an indication of the x-ray photons incident on the detector.

In tomography apparatus, the detector 10 is positioned in an array alongside other similar detectors 10 as indicated in FIG. 1. Preferably with rectangular detectors, the detectors are stacked along the long edge of the crystal. This allows fine spacial resolution, while permitting large detector area. If desired, a thin layer 36 of X-ray opaque material such as 60-40 solder can be placed between the adjacent detectors 10 to function as an X-ray collimator. That prevents the same X-rays from passing through one detector and being detected by an adjacent detector. In some application, however, it might be desirable to omit the collimator material 36 so that there is no definite boundary between adjacent detectors. The resultant interaction between some incident X-rays and both detectors is believed to smooth out discontinuties in those parts of the resultant tomographic image corresponding to the boundaries between adjacent detectors 10.

In some applications, it is also desirable to mount the photo-diode on the scintillator rather than vice versa as in FIG. 1 because the scintillator material is much heavier and denser than the diode material.

Figure 2:
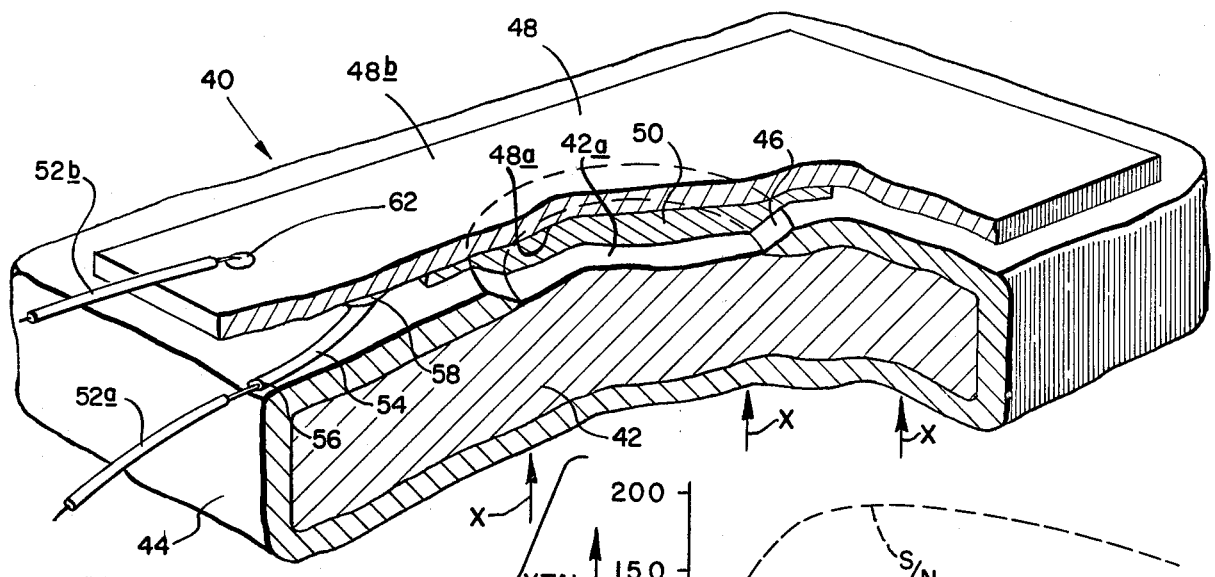
FIG. 2 is a similar view of another embodiment of the detector.

A detector of this type which is particularly small and compact is indicated generally at 40 in FIG. 2. The materials comprising the detector can be the same as the ones described above in connection with the FIG. 1 detector embodiment. Detector 40 includes a generally rectangular scintillator 42 that functions as a base for the detector as a whole. As before, the scintillator 42 is coated all over with a reflective coating 44 except for a relatively small-area window 46 in its upper surface 42a.

Mounted on scintillator 42 opposite window 46 is a generally rectangular photo-diode 48. The active surface 48a of the photo-diode is secured to the scintillator surface 42a by means of a suitable cementitious material 50 which provides an optical interface between the scintillator and the diode. Prior to securing the diode, a pair of electrical leads 52a and 52b are connected to opposite surfaces of the diode. The former lead is electrically connected to one end of a foil strip 54 by solder bead 56. The opposite end of the strip is connected by a second solder bead 58 to the active surface 48a of the diode 48. The remaining terminal 52b is connected to the base surface 48b of the diode by a solder connection 62.

X-rays incident upon the detector 40 from the direction indicated by the arrows X cause the scintillator to scintillate. the resultant emitted photons are incident upon the photo-diode 48 which produces a current that can be measured at terminals 52a and 52b. Alternatively, the detector scintillator can be mounted on a printed circuit board (not shown) with the incident radiation arriving from the diode side of the detector, since the diode material is essentially transparent to the X-rays Further improvement in the signal-to-noise ratio of detectors 10 and 40 can be obtained by cooling the detectors or the associated electronics or both. In fact, the ratio is doubled for every 10° C. reduction in temperature.

Using the foregoing techniques then, a very small X-ray detector can be constructed and juxtaposed in close association with other similar detectors in an array that is capable of measuring the intensity of emergent radiation in a tomography scanner that operates at relatively high scan speeds. Despite the smallness of the detector, it is quite efficient and accurate so that the detector array produces a maximum amount of usable information about the body slice being examined. Yet, because the detector is a unitary structure consisting of bonded-together materials, it is relatively rugged and should have a long useful life.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawing be interpreted as illustrative and not in a limiting sense.

It is also to be understood that the following claims are intended to cover all of the generic and specific features of the invention herein described.

I claim:

1. An X-ray detector for use in integrating mode in high speed tomography apparatus comprising:
    A. a scintillator that emits light in response to incident X-rays, said scintillator having a surface of a selected total area,
    B. a coating that reflects said light emitted by the scintillator covering the entire surface area of said scintillator except for a window in one surface,
    c. a photo-diode whose output current is substantially linearly related to the light incident on the diode, said diode having one surface positioned directly opposite said window, the ratio of the active area of the diode to the area of the scintillator covered by said coating being appreciably less than unity, and
    D. means for bonding said diode to said one scinitiallator surface in said window, said bonding means being transparent to the light emitted by the scintillator in response to the incident X-rays.

2. The detector defined in claim 1 wherein the bonding means has an index of refraction intermediate the indices of the scintillator and photo-diode.

3. The detector defined in claim 2 wherein the bonding means comprises an epoxy cement.

4. The detector defined in claim 1 wherein the photo-diode is a P.I.N. type diode.

5. The detector defined in claim 1 wherein the area of said window is appreciably less than said one area of the scintillator surface.

6. The detector defined in claim 5 wherein the area of said one diode surface is greater than the area of said window so that light from the scintillator is incident on only a portion of said one diode surface.

7. The detector defined in claim 1 and further including
   A. an additional similar detector,
   B. means for positioning said detectors so that their corresponding scintillator surfaces other than said one surface are opposite one another, and
   C. an X-ray absorbent material extending between said opposite surfaces of said detectors so that X-rays cannot pass through one detector and interact with the other detector.

8. The detector defined in claim 1 wherein the bonding means has an index of refraction intermediate the indices of the scintillator and photo-diode.

9. The detector defined in claim 1 and further including
   A. a can enclosing the diode, said can being bonded to the scintillator,
   B. a pair of terminals projecting from a surface of the can, and
   C. electrical leads connecting opposite surfaces of the diode to different ones of said terminals.

10. The detector defined in claim 1
    A. wherein said one diode surface is substantially coextensive with said one scintillator surface, and
    B. further including electrical leads connected to said one diode surface and to the diode surface opposite said one diode surface.

11. The detector defined in claim 1 and further including a current integrator and means for applying the output of the diode to the current integrator so that the output of the integrator provides an indication of the photons incident on the detector.

* * * * *

UNITED STATES PATENT OFFICE
CERTIFICATE OF CORRECTION

Patent No. 4,110,621   Dated August 29, 1978

Inventor(s) Berthold K. P. Horn

It is certified that error appears in the above-identified patent and that said Letters Patent are hereby corrected as shown below:

Col. 2, line 6, "photo-voltiac" should be --photo-voltaic--.

Col. 3, line 51, "ligh" should be --light--.

Col. 4, line 66, "signal-to noise-ratio" should be --signal-to-noise ratio--.

Col. 5, line 34, "discontinuties" should be --discontinuities--.

Col. 6, line 44, "c." should be --C.--.

Col. 6, line 51, "scinitial-" should be --scintil---.

*Signed and Sealed this*

*Twenty-second* Day of *May 1979*

[SEAL]

Attest:

RUTH C. MASON
*Attesting Officer*

DONALD W. BANNER
*Commissioner of Patents and Trademarks*